United States Patent [19]

Flocchini

[11] Patent Number: 4,498,419
[45] Date of Patent: Feb. 12, 1985

[54] BACKWASH VALVE AND SYSTEM FOR TEAT CUP ASSEMBLY

[76] Inventor: Andrew J. Flocchini, 7050 Lakeville Hwy., Petaluma, Calif. 94952

[21] Appl. No.: 434,979

[22] Filed: Oct. 18, 1982

[51] Int. Cl.³ .............................................. A01J 7/00
[52] U.S. Cl. ................................................. 119/14.18
[58] Field of Search ........................... 119/14.18, 14.08

[56] References Cited

U.S. PATENT DOCUMENTS 4,222,346  9/1980  Reisgies .......................... 119/14.18

Primary Examiner—Hugh R. Chamblee

[57] ABSTRACT

A backwash valve for connection between teat cup assembly and milk manifold is illustrated. The valve includes a milk inlet, a central valve chamber and a milk outlet. The milk inlet communicates to the teat cup assembly. The milk outlet communicates to the milk receiving manifold, which manifold is typically under a vacuum. A valve head reciprocates through the central chamber into and out of sealing contact with the milk outlet. The valve head and valve seat reciprocate out of the central valve chamber to an isolation chamber during backwash. Any leak between valve head and valve seal sees the vacuum. By reciprocation of the valve seat to the isolation chamber, vacuum communicated to the milk outlet does not expose contaminates present in the backwash solution to leakage through the seal. Backwash fluid is introduced through a chamber communicated to the valve head and passes out into the central valve chamber. Thereafter the backwash fluid flows out the milk inlet and teat cup assembly along a reverse flow path. When cleaning is completed, the valve head reciprocates upwardly and the attached teat cup assembly discharges milk through the milk inlet, central valve chamber and milk outlet. A cleaning disposition is disclosed wherein the isolation chamber is placed in a flow path with cleansing fluid following the path. During this cleaning disposition, substantially all operatively portions of the valve are cleansed and purged by the cleaning solution after milking has terminated.

5 Claims, 6 Drawing Figures

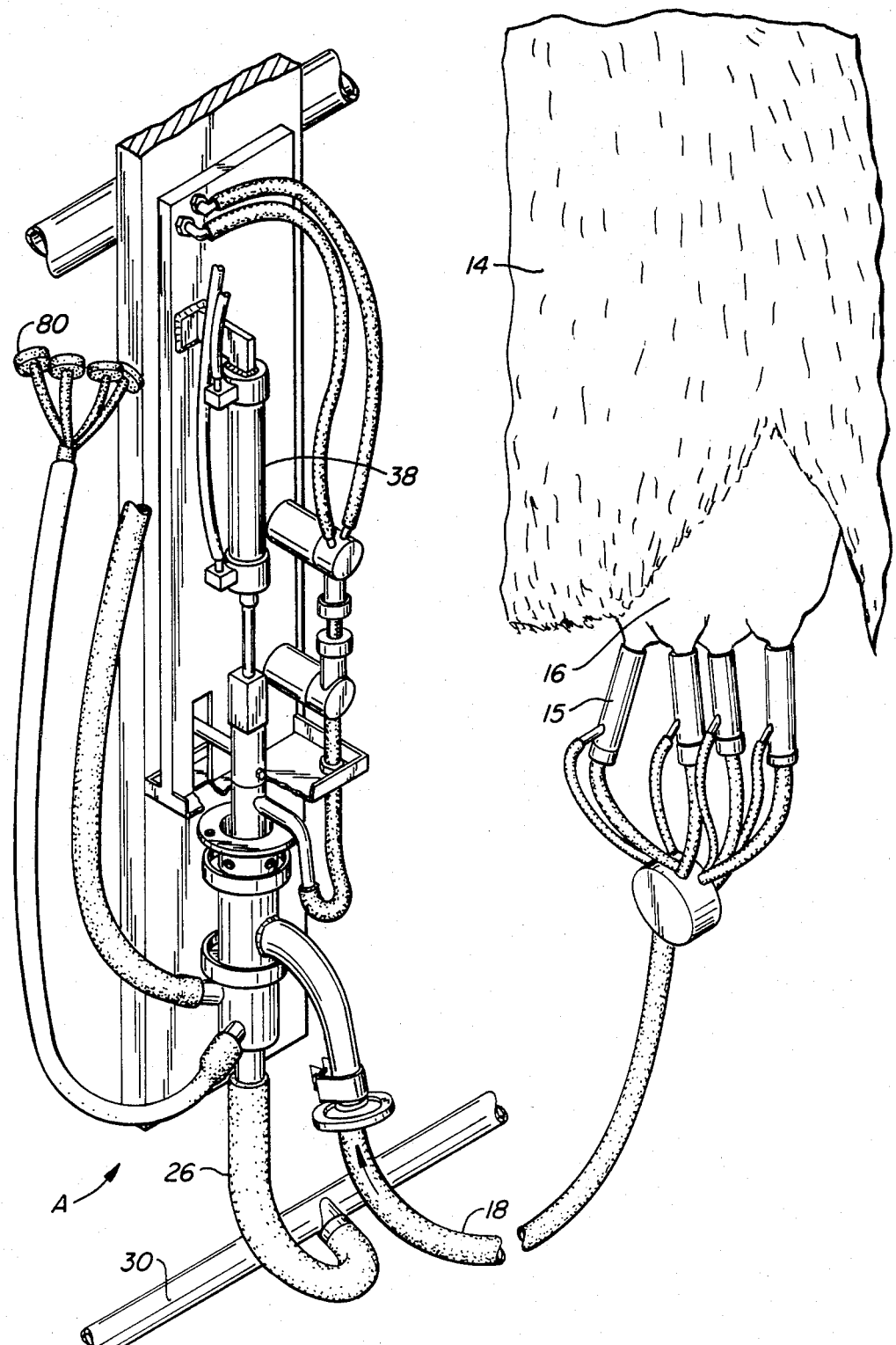
FIG._1.

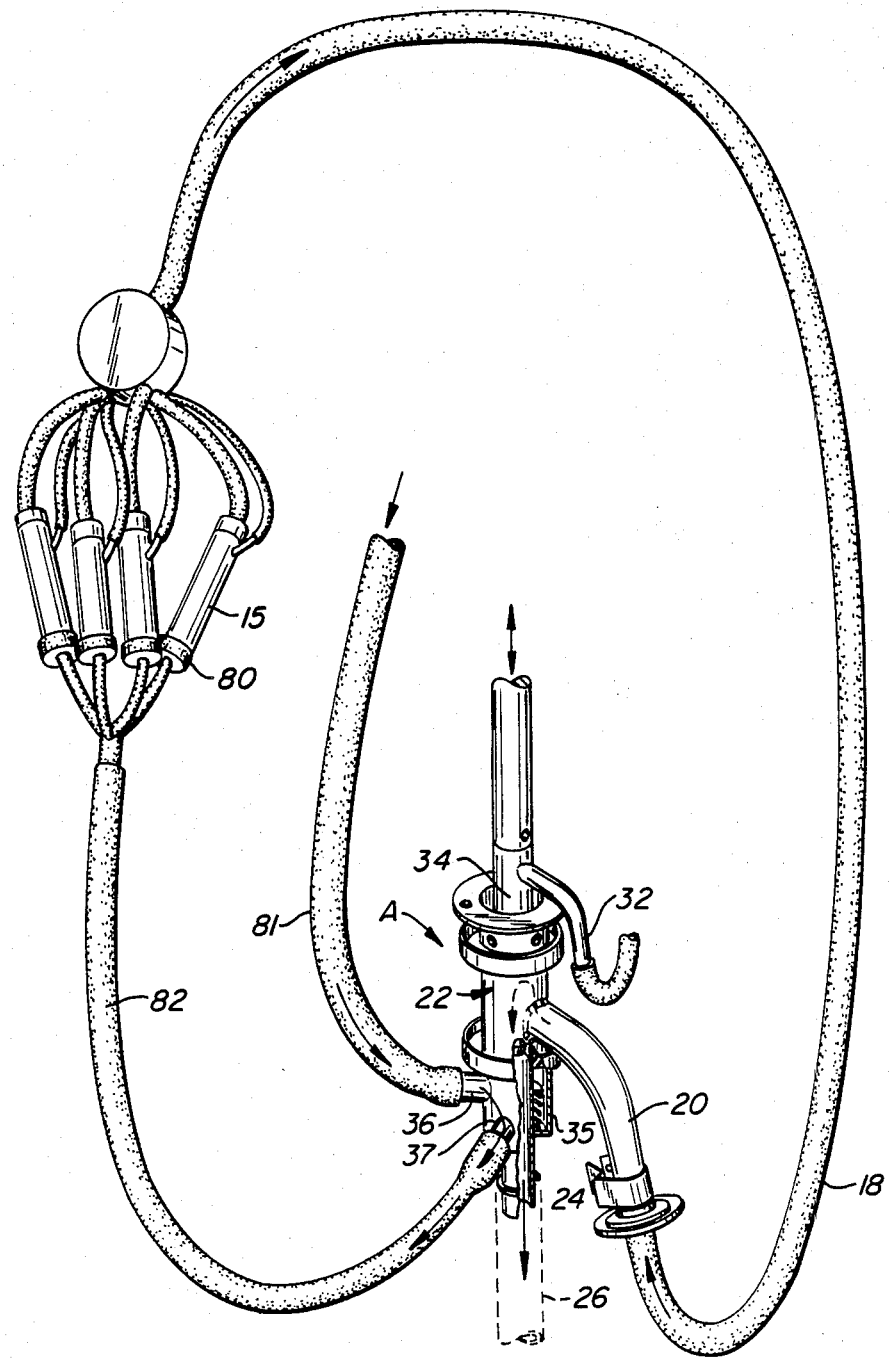
FIG._2.

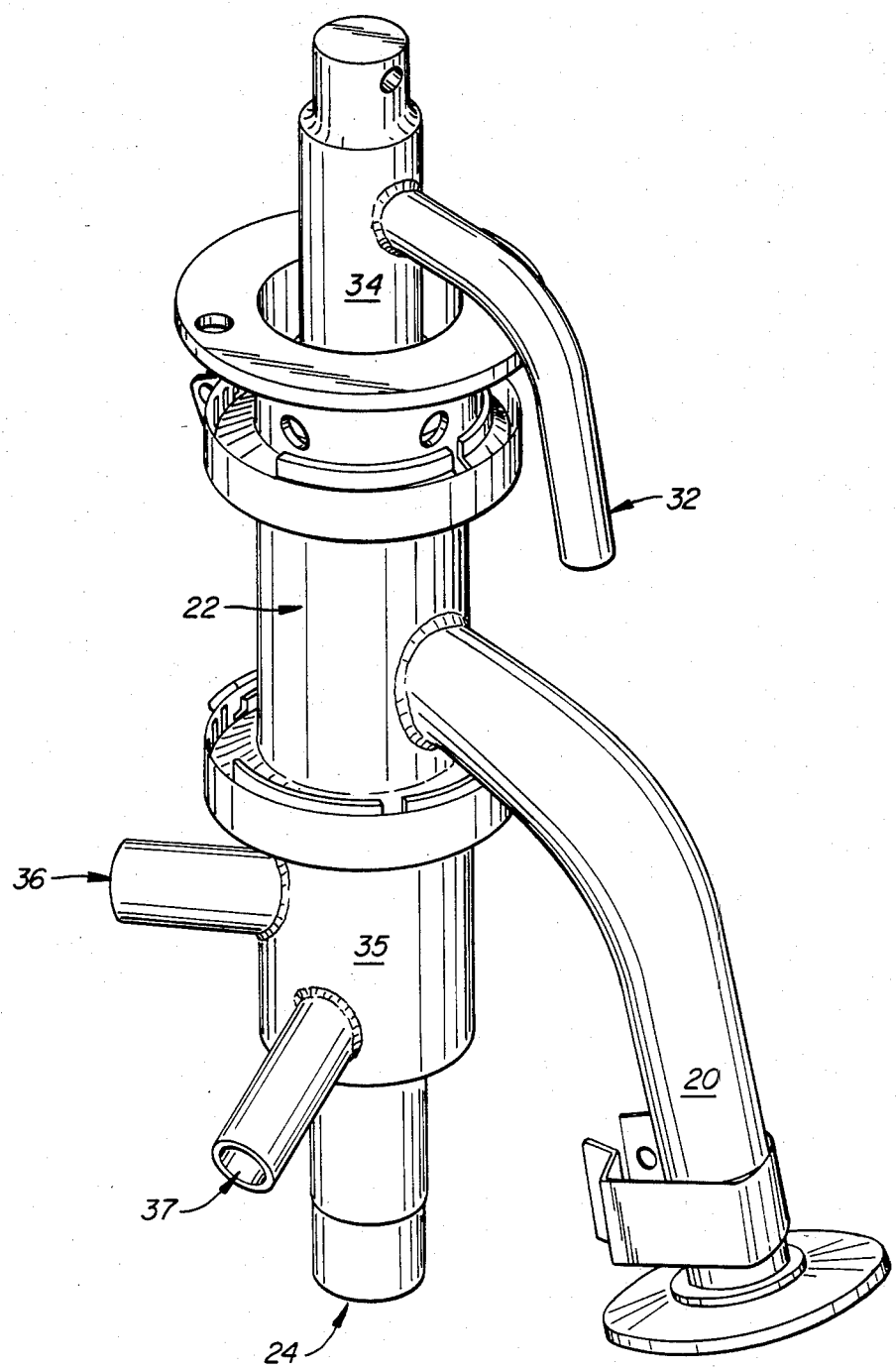
FIG._3.

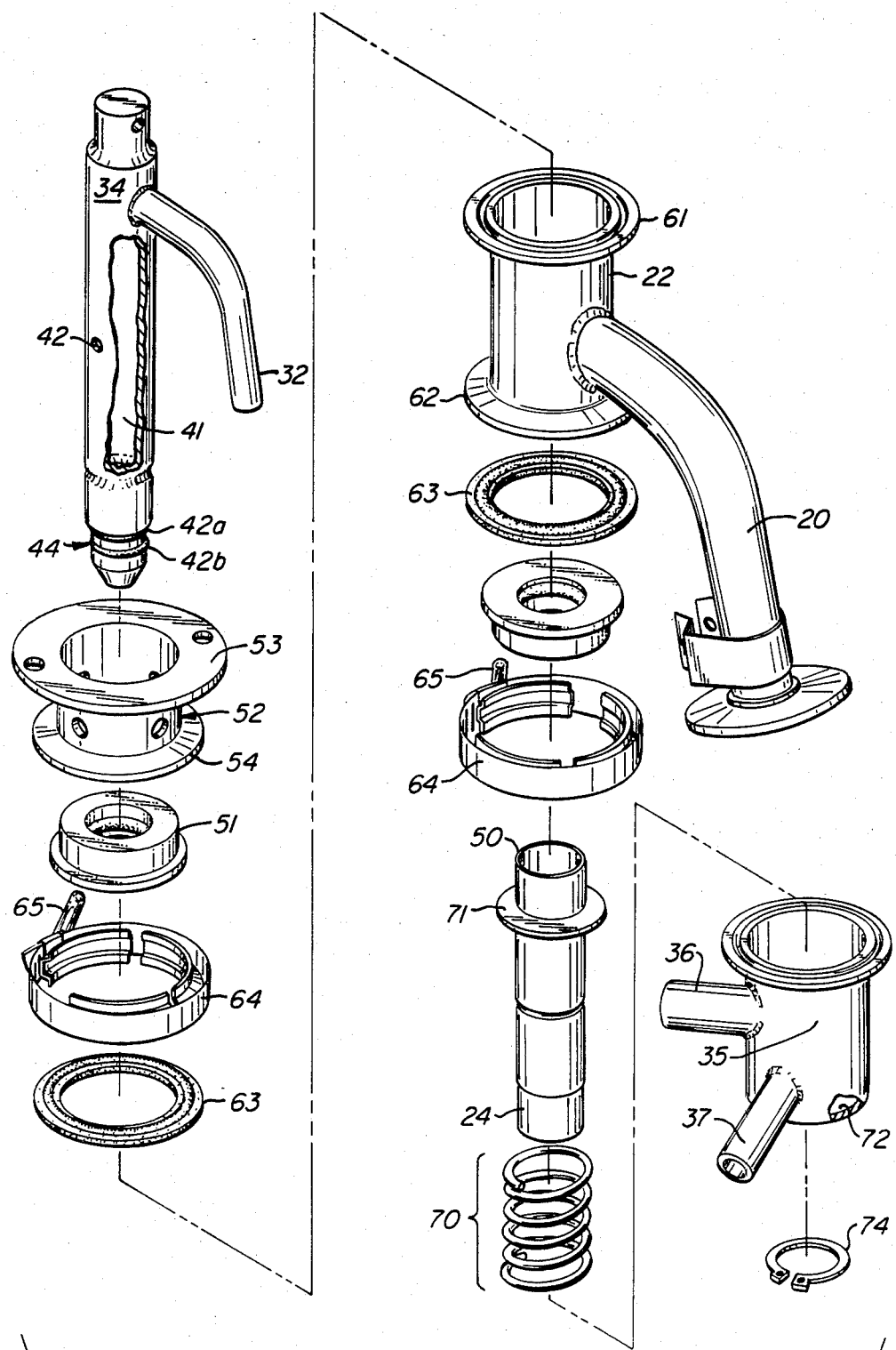
FIG._4.

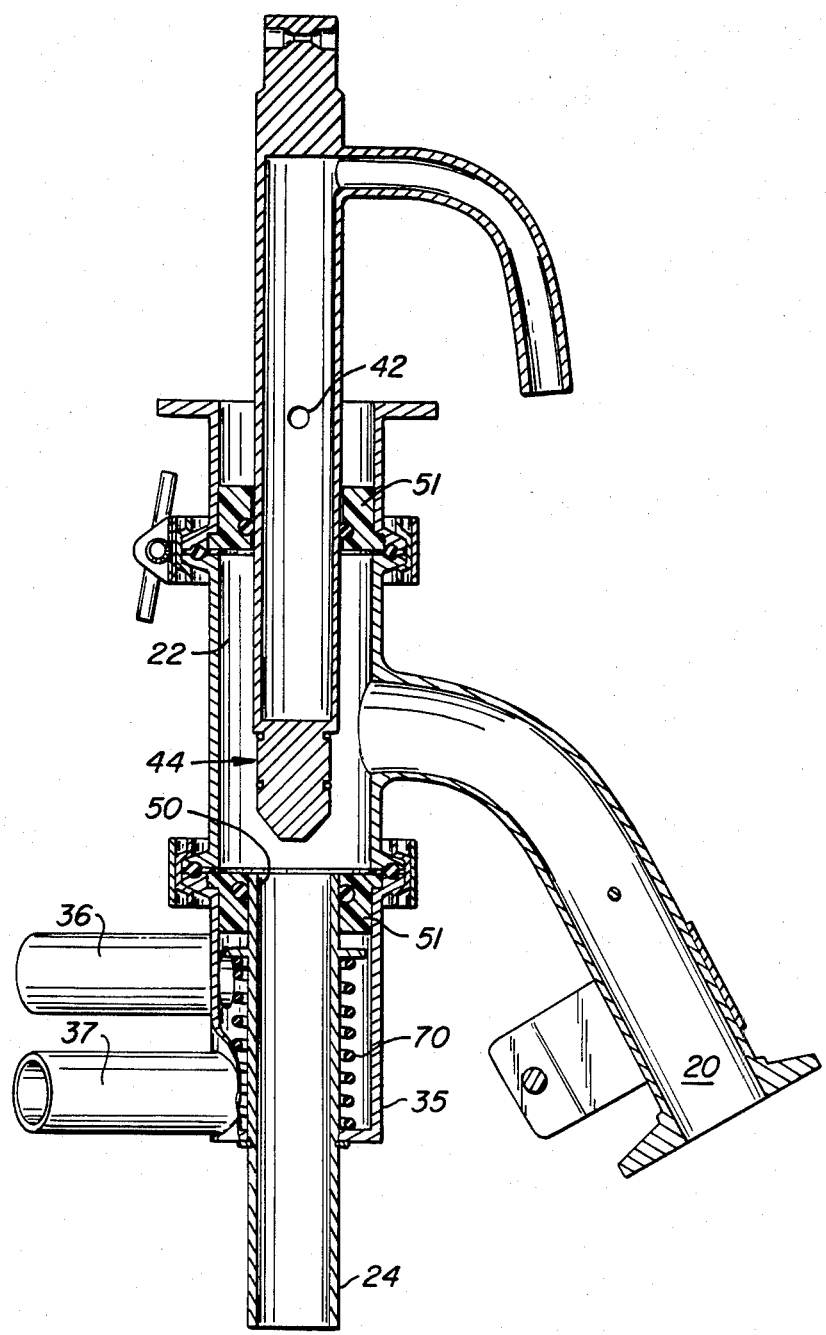
FIG._5.

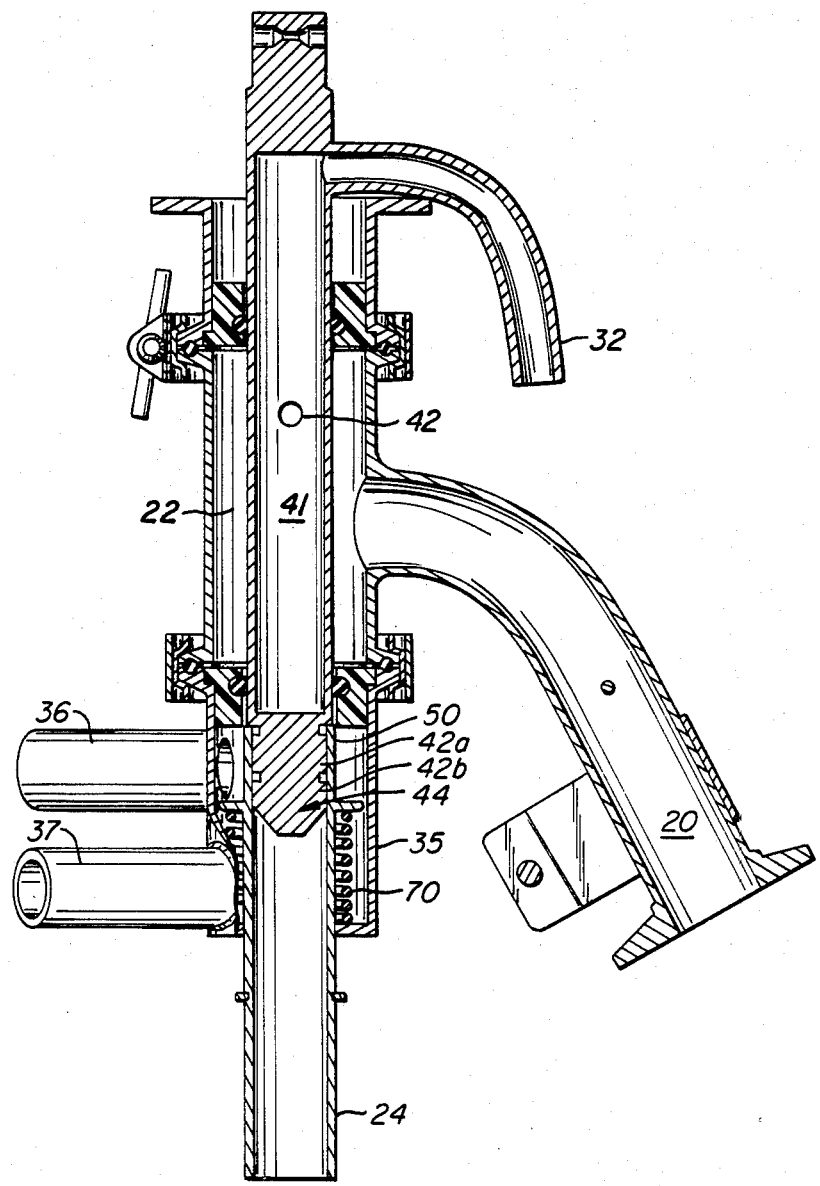
FIG._6.

BACKWASH VALVE AND SYSTEM FOR TEAT CUP ASSEMBLY

This invention relates to automated milking and in particular discloses a backwash valve which is situated between the teat cup assembly and milk receiving manifold of a dairy. The valve in operation permits backwashing to occur between sequential milkings of each cow of a dairy herd without the danger of contamination of the milk with the disinfecting backwash solution.

SUMMARY OF THE PRIOR ART

In dairy herds, automated milking equipment is used sequentially on many animals during each milking. One animal with an infected udder or "bag" can contaminate the remaining animals by infecting the milking equipment—especially the teat cup assembly—and thereafter having the infected milking equipment placed on other members of the herd. Therefore, it has been identified and is known in the prior art that it would be extremely desirable to sequentially backwash the teat cup assemblies between sequential milkings. For example and as relevant art to the patent application herein see Reisgies U.S. Pat. No. 4,222,346 issued Sept. 16, 1980, entitled "Milk Line Back Flushing Method and Apparatus".

Regarding these general types of apparatus, they suffer from at least two deficiencies. First, the devices include slider type valves. In such slider type valves, a flat plate with a plurality of outlet apertures registers to an inlet aperture. The registration of the outlet apertures is dependent upon the flow required during the various stages of the milking-cleaning cycle. While the correct flow is produced, the sliding plate is an ideal site for the accumulation of wasted and spoiling milk. Contamination rapidly occurs. The necessity of continual dismantling and cleansing of valves is required with such equipment.

Moreover, and where sequential backwashing between sequential milkings is required, the disinfectant solution always constitutes a potential contaminate for the milk. This being the case, and assuming that one wishes to avoid the slider type valve, a valve must be selected wherein the possibility of the leakage from the backwash solution to the milk manifold is avoided. When one remembers that the milk manifold is constantly under a vacuum, it becomes apparent that the seal when leaking will literally "look for" waste solution and cause the waste solution to be drawn to, towards, and into the milk manifold. Therefore with any kind of a backwash system one of the principal dangers is the contamination of the milk supply with the backwash solution. To applicant's knowledge this problem has been inadequately addressed in the prior art.

SUMMARY OF THE INVENTION

A backwash valve for connection between teat cup assembly and milk manifold is illustrated. The valve includes a milk inlet, a central valve chamber and a milk outlet. The milk inlet communicates to the teat cup assembly. The milk outlet communicates to the milk receiving manifold, which manifold is typically under a vacuum. A valve head reciprocates through the central chamber into and out of sealing contact with the milk outlet. The valve head and valve seat reciprocate out of the central valve chamber to an isolation chamber during backwash. Any leak between valve head and valve seal sees the vacuum. By reciprocation of the valve seat to the isolation chamber, vacuum communicated to the milk outlet does not expose contaminates present in the backwash solution to leakage through the seal. Backwash fluid is introduced through a chamber communicated to the valve head and passes out into the central valve chamber. Thereafter the backwash fluid flows out the milk inlet and teat cup assembly along a reverse flow path. When cleaning is completed, the valve head reciprocates upwardly and the attached teat cup assembly discharges milk through the milk inlet, central valve chamber and milk outlet. A cleaning disposition is disclosed wherein the isolation chamber is placed in a flow path with cleansing fluid following the path. During this cleaning disposition, substantially all operative portions of the valve are cleansed and purged by the cleaning solution after milking has terminated.

OTHER, OBJECTS, FEATURES AND ADVANTAGES

An object of this invention is to disclose a backwash valve installed between the teat cup assembly and milk receiving manifold which enables and facilitates backwash of the teat cup assembly between sequential milkings of cows. According to this aspect of the invention, a valve is disclosed having a milk inlet from the teat cup assembly, a milk outlet to the vacuum manifold and a central receiving chamber there between. A reciprocating valve head moves in the central chamber. This valve head is upward and away from the milk outlet during milking and in a closing and sealing disposition over the milk outlet at a valve seat during backwashing. The valve head is attached to a reciprocating cylinder. This cylinder causes axial movement of the valve head in the central valve chamber.

An advantage of the disclosed valve assembly is that it is not of the sliding block variety. Instead, the valve head reciprocates axially of a cylindrical, central, and concentrically surrounding valve chamber where obscured and isolated surfaces are avoided. Consequently, cleaning of the valve by backwashing can easily occur.

Yet another object of this invention is to disclose a valve and seat for a milk outlet which valve and seat are moved out of the backwash environment during backwashing. According to this aspect of the invention, the milk outlet and valve seat are reciprocal and spring biased. As the valve head closes upon the valve seat, the valve seat reciprocates downwardly into an isolation chamber. Preferably, this isolation chamber is communicated to atmosphere. Thereafter backwash solution is introduced to the central valve chamber in reverse flow out the milk outlet to clean the teat cup assembly. The valve head and seat at the sealing interface are no where near the backwash flow.

An advantage of this aspect of the invention is that the valve head and valve seat at their seal are moved from the vicinity of the central valve chamber during backwashing. Any leak that is present between the head and seat cannot draw into the vacuum system and receiving milk manifold disinfecting contaminates present in the backwash solution.

Yet another advantage of this aspect of the invention is that some kind of leakage is inevitable. With continued use, seals in the valve head to the valve seat will break down. When they break down, only air will be drawn to the vacuum system. No backwash fluid will be drawn to the vacuum. Backwash solution will not be introduced in the vacuum system due to the fact that the valve head and seat are resident in the isolation chamber during cleansing.

Yet another object of this invention is to disclose a valve which at the end of each sequential (and usually twice a day) milking of a herd can be placed with ease in an overall cleansing cycle. According to this aspect of the invention, cleansing and purging solution in the milking system is first communicated from a cleansing solution manifold to the isolation chamber. From the isolation chamber, flow of the cleansing fluid occurs to a teat cup assembly cleansing head, through the teat cup assembly and along the normal milk flow path. This normal path includes the milk inlet, the central valve chamber and the milk outlet. During this overall cleaning cycle, the valve head is reciprocated and exposed at all portions to the flow of cleansing fluid. At this time substantially all portions of the valve are cleansed.

An advantage of this aspect of the invention is that the disclosed valve participates all its working and moving parts in the cleaning cycle and backwash cycles here disclosed. Consequently, a maximum interval of time may elapsed between required disassemblies and cleaning of the valve.

Yet another advantage of this aspect of the invention is that even the seals between the valve head and valve seat are cleansed.

Other objects, features and advantages of this invention will become more apparent after referring to the following specifications and attached drawings in which:

FIG. 1 is a perspective of the milking apparatus of this invention illustrating the teat cup assembly attached to the bag of the cow, and the valve assembly of this invention between the teat cup assembly and outlet manifold;

FIG. 2 is a perspective similar to FIG. 1 with the teat cup assembly placed in its "end of milking" disposition to enable a cleaning cycle;

FIG. 3 is a perspective enlarged view of the valve of this invention;

FIG. 4 is an exploded perspective view of the discrete components of the valve of FIG. 3;

FIG. 5 is a side elevation section of the assembled valve of FIG. 3 with the valve shown in the milking disposition; and, FIG. 6 is a side elevation section of the valve of this invention with the valve shown in the backwash disposition.

Referring to FIG. 1, a milking station having the valve incorporated thereto is illustrated. Specifically, a cow 14 is shown having a teat cup assembly 15 attached to the bag or udder 16. A milk conduit 18 runs from the teat cup assembly 15 into the valve A of this invention. Valve inlet 20, referring to FIG. 2 communicates the inflowing milk to a central valve chamber 22 and then outwardly through the bottom of valve A.

From the valve A and referring to FIG. 1, normal milk flow passes through a conduit 26 to the vacuum milk receiving manifold 30 thus FIG. 1 is an illustration of the normal flow of milk during the milking of a cow.

Referring to FIGS. 3 and 4, and commencing at the upper left corner of FIG. 4, valve head 34 is illustrated. This valve head has a hollow inner portion 41 and a pair of outlet ports 42, which outlet ports permit backwash fluid to flow there through. Assuming that the valve head 44 at seal rings 42A and 42B is on the valve seat 50, as will hereinafter be illustrated, it will be seen that port 42 is within the central chamber of the valve. Flow of the backwash fluid through the port 42 causes cleansing of the milk conduit 20 and teat cup assembly.

Backwash fluid must be introduced into chamber 41. Such introduction occurs at a conduit 32.

The valve head 44 enters into and out of the central chamber 22 through a neoprene washer 51. This washer is in turn a slip fit into a flange washer receiving assembly 52 having a first annular and upper flange 53 and a lower flange 54. The flange washer receiving assembly 52 is suitably configured with drainage holes so that upon dairy wash down drainage of pools of water that might otherwise accumulate above the washer 51 occurs.

Central chamber 22 is easily understood. It has an upper overlying flange 61 and an underlying flange 62. These respective flanges 61, 62 are fitted with suitable seal rings 63 and compression ring 64. When the valve is assembled and a twist screw 65 turned firm fastening occurs.

The valve head must pass down through the central milk chamber 22 and into the isolation chamber 35. In order that this may happen, it passes through a second neoprene washer 70. Neoprene washer 70 serves as the bottom guide to the valve and heads the valve to and towards valve seat 50. As has been previously illustrated, similar seal rings 63, clamping ring 64 and a key lock 65 fasten the isolation chamber 35 to the central valve chamber 22.

It is required that the seat 50 of the valve be reciprocal into and out of the isolation chamber 35. This being the case, a compression coil spring 70 biases the seat 50 upwardly at a ring 71 and itself bears upon the lower portion of the isolation chamber 35 at a surface 72 shown in the broken away portion.

Reciprocal movement of seat 50 is achieved by the action of a reciprocating cylinder 38 attached to valve head 34 as depicted in FIG. 1.

A keeper ring 74 is locked on outlet conduit 24 such that contact between the keeper ring and surface 72 of isolation chamber 35 limits the inward movement of the outlet conduit resulting from the biasing by spring 70. This allows for the reciprocation of valve seat 50 between central chamber 22 and isolation chamber 35.

Having set forth the catalog of parts of the invention, the assembled disposition of the valve can be understood with respect to FIGS. 5 and 6. In order that the reader may understand the invention, we will first discuss the milking disposition of the valve with respect to FIG. 5, thereafter, we will discuss the backwash disposition of the valve with espect to FIG. 6. Finally, we will return to FIGS. 2 and 5 and discuss the disposition of the valve wherein cleaning occurs after milking.

Referring to FIG. 5, the valve is shown in the position wherein valve head 44 has moved off of valve seat 50. Milk flowing into conduit 20 passes the valve head 44, flows through the valve seat 50 and out the milk outflow conduit 24. The reader can rapidly understand the normal flow of milk.

It is important to note that during this outflow of milk, backwash outflow 42 is raised above neoprene gasket 51. In this raised position, it is not possible for any backwash fluid to flow into the central chamber 22 of the valve. This being the case, pollution of the flowing milk by the backwash fluid cannot occur.

Now and with reference to FIG. 6, backwash disposition of the valve is illustrated. Referring to FIG. 6, it can be seen that valve head 44 has been depressed downwardly. This has in turn compressed coil springs 70 and disposed the valve seat 50 into the isolation chamber 35. In the isolation chamber 35, the tendency of vacuum communicated to the outlet 24 to draw backwash fluid is eliminated. An explanation would be helpful.

Specifically, closure of valve head 44 on seat 50 at the central chamber 22 is the only seal utilized, eventual wear of the seal rings 42A,42B could cause leakage to occur. As a vacuum is communicated to the outlet 24, any leakage which occurred in chamber 22 while backwashing fluid was passed there through would cause the backwashing fluid to be drawn in with the milk. By movement of the valve head and valve seat down into the isolation chamber and by communication of the isolation chamber outlet 37 to atmosphere, the valve seat is moved from an environment where contamination might likely occur (central chamber 22) to an environment where contamination cannot possibly occur (isolation chamber 35). Contamination of the milk outlet 24 cannot occur because any leak resulting from wear of or damage to seal rings 42A and 42B will be of air as opposed to backwashing fluid. This is because isolation chamber outlet 37 is open to atmosphere at the point of the teat cup cleaning attachment 80 as may be seen in FIG. 1. Consequently, any leak in the seal rings opens chamber 24, when under vacuum, to air as opposed to backwash fluid.

The rest of the backwash disposition is readily understood. Specifically, backwash fluids are communicated through the hollowed portion of the valve head 41 and out the aperture 42. Thereafter, reverse flow out through the teat cup assembly through manifold 20 occurs. Flow eventually occurs through the conduit to the teat cup assembly.

Having set forth this feature of the invention, attention can be devoted to the cleaning disposition of the teat cup assembly. Typically, the teat cup assembly 15 is attached to a cleaning attachment 80 as depicted in FIG. 2. Whereas such attachments are well known in the art, the overall flow path utilizing this valve is not so easily known.

Specifically, inflow occurs at a conduit 81 of backwashing solution. This inflow passes into the isolation chamber inlet 36 and out the isolation chamber outlet 37. Thereafter, it passes through conduit 82 to the teat cup assembly cleaning attachment 80. This flushing of the isolation chamber is necessary to prevent contamination of the chamber which might result from milk leaking into the chamber due to wear of or damage to seal rings 42A and 42B. At 80, it then passes through the normal milking path. The valve during such cleaning is held in the disposition illustrated in FIG. 5. The flow of backwash fluid during the cleaning cycle is illustrated by the arrows in FIG. 2.

Paying attention to the disposition indicated in FIG. 5, it will be noted that the valve cleansing solution will pass through when the valve head 44 is in the upward position. As the backwashing fluid passes by the valve head it will clean the seals and rings. In short, when the valve is in this position, all working parts of the valve will be cleansed including the seal rings interiorly of the neoprene gasket 51. Thus not only does the disclosed valve participate in the flushing of teat cup assemblies between the milking of animals, but additionally participates in the after milking cleaning. The valve in its construction is made so that disassembly for cleaning purposes can be prolonged.

It is common of the valves herein illustrated, that they be provided with backflushing. It is not the purpose of the application herein to show various circuits for backwashing of the valve. So that the reader may be acquainted with circuits that do provide backwashing, reference is here made to Reisgies U.S. Pat. No. 4,222,346 issued Sept. 16, 1980 and entitled "Milk Line Back Flushing Method and Apparatus". While the valve herein shown differs in operative function in that a natural position in which the backflush input port and milk output line are both blocked is not used, the backwash circuitry therein illustrated could in fact be used for the operability of this valve.

Regarding backwashing, I have discovered that by pulsating iodine into the flow stream more efficient iodine usage results. Pulsation in the ratio of parts per million of iodine to water for time periods of two seconds each separated by a non iodine flow interval of three seconds produce preferred results. This has been found by laboratory test to be equivalent to steady iodine flow at 30 parts per million.

The reader will appreciate that this invention may be practiced with modification.

What is claimed:

1. A backwash valve for use between a teat cup assembly and a milk manifold comprising:
    a main valve body defining a central valve chamber and including a main inlet, a main outlet and a valve seat along a fluid path between said main inlet and said main outlet, said main inlet fluidly connected to the teat cup assembly and the main outlet fluidly connected to the milk manifold; and
    a valve head member movably mounted to the main valve body for movement between a first, milking position and a second, backwash position, said valve head member including:
    a valve surface sized for mating engagement with said valve seat when said valve head member is in said second position thereby sealing said main outlet from said main inlet;
    a head inlet; and
    a head outlet fluidly connected to said head inlet, said head outlet disposed along said valve head member so to fluidly communicate with said central valve chamber when said valve head member is in said second, backwash position and to fluidly isolate said head outlet from said central valve chamber when said valve head member is in said first, milking position;
    whereby said backwash valve allows the teat cup assembly to be backwashed between animals without disassembly of the teat cup assembly from the milk manifold.

2. The backwash valve of claim 1 further comprising:
    means for movably mounting said valve seat within said main valve body to move between a first location and a second location; and
    means for biasing said movable valve seat towards said first location, said valve seat being in said first location when said valve head member is in said first position and being in said second location when urged into said second location by said valve head member moving into said second position, said second location being external of said central valve chamber.

3. The backwash valve of claim 2 including a sealing member mounted to said main valve body and surrounding said valve seat and through which said valve seat and said valve surface move.

4. The backwash valve of claim 2 wherein said main valve body includes a secondary chamber housing said movably mounting means and said biasing means and having a secondary chamber inlet and a secondary chamber outlet to permit said secondary chamber to be cleaned by flowing cleaning fluid into said secondary chamber inlet, through said secondary chamber and out said secondary chamber outlet.

5. A milking conduit and backwash assembly for use with a milk manifold when milking animals, the assembly comprising:
- a teat cup assembly;
- a milk conduit fluidly connected at a one end to said teat cup assembly;
- a main valve body defining a central valve chamber and including a main inlet, a main outlet and a valve seat along a fluid path between said main inlet and said main outlet, said main inlet fluidly connected to another end of said milk conduit and the main outlet fluidly connected to the milk manifold;
- a valve head member movably mounted to the main valve body for movement between a first, milking position and a second, backwash position, said valve head member including:
  - a valve surface sized for mating engagement with said valve seat when said valve head member is in said second position thereby sealing said main outlet from said main inlet;
  - a heat inlet; and
  - a head outlet fluidly connected to said head inlet, said heat outlet disposed along said valve head member so to fluidly communicate with said central valve chamber when said valve head member is in the second, backwash position and to fluidly isolate said head outlet from said central valve chamber when said valve head member is in said first, milking position;
- whereby said backwash valve allows the teat cup assembly to be backwashed between animals without disassembly of said teat cup assembly from the milk manifold;
- means for movably mounting said valve seat within said main valve body to move between a first location and a second location;
- means for biasing said movable valve seat towards said first location, said valve seat being in said first location when said valve head member is in said first position and being in said second location when urged into said second location by said valve head member moving into said second position, said second location being external of said central valve chamber;
- said main valve body including a secondary chamber housing said movably mounting means and said biasing means and having a secondary chamber inlet and a secondary chamber outlet to permit said secondary chamber to be cleaned by flowing cleaning fluid into said secondary chamber inlet, through said secondary chamber and out said secondary chamber outlet; and
- a teat cup cleaning attachment fluidly coupled to said secondary chamber outlet, said attachment adapted to connect to said teat cup assembly for cleaning;
- whereby with said teat cup cleaning attachment connected to said teat cup, a cleaning fluid pumped into said secondary chamber inlet passes through said secondary chamber, said attachment, said teat cup assembly, said milk conduit, said main inlet, said valve seat and said main outlet when said valve head member is in said first position to clean said milking conduit and backwash assembly.

* * * * *